(12) United States Patent
Watanabe et al.

(10) Patent No.: US 6,474,196 B2
(45) Date of Patent: Nov. 5, 2002

(54) METHOD OF PRODUCING PRESS-FORMING PUNCH AND DIE

(75) Inventors: Teiji Watanabe; Masafumi Nakamura; Yoshikazu Nakamura, all of Hamamatsu (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/783,357

(22) Filed: Feb. 14, 2001

(65) Prior Publication Data

US 2001/0013265 A1 Aug. 16, 2001

(30) Foreign Application Priority Data

Feb. 15, 2000 (JP) ........................................ 2000-036463

(51) Int. Cl.⁷ ................................................. B21K 5/20
(52) U.S. Cl. ..................................... 76/107.1; 72/466.8
(58) Field of Search ............................ 76/101.1, 107.1; 72/462, 466.8

(56) References Cited

U.S. PATENT DOCUMENTS

| | | | | | |
|---|---|---|---|---|---|
| 2,465,019 A | * | 3/1949 | Johnson | ...................... | 76/107.1 |
| 3,101,065 A | * | 8/1963 | Kalis | ........................ | 72/466.8 |
| 3,343,430 A | * | 9/1967 | Haas et al. | ................. | 76/107.1 |
| 3,727,489 A | * | 4/1973 | Inoue | ......................... | 76/107.1 |
| 4,088,046 A | * | 5/1978 | Severinsson | ............... | 76/107.1 |
| 4,987,799 A | * | 1/1991 | Soth | ........................... | 76/107.1 |
| 5,813,276 A | * | 9/1998 | Maeda | ........................ | 72/462 |
| 6,279,425 B1 | * | 8/2001 | Cicotte | ...................... | 76/107.1 |

OTHER PUBLICATIONS

Specification of Application No.: 09/741554.
Specification of Application No.: 09/782846.

* cited by examiner

Primary Examiner—Hwei-Siu Payer
(74) Attorney, Agent, or Firm—Merchant & Gould, P.C.

(57) ABSTRACT

An economical method of producing a press-forming die is disclosed wherein a master die and a master punch are relatively reciprocated to produce a press-formed panel. A working surface of the master die is cut down by a predetermined cutting depth, and the press-formed panel is fitted over the master punch. While a second blank sheet having a thickness equal to the cutting depth of the master die working surface is placed between the master die and the press-formed panel fitted over the master punch, the master die and punch are relatively reciprocated whereby the second blank sheet is press-formed into a die panel. A back-up material such as high-strength cement is then applied to the rear surface of the die panel whereby a press-forming die is produced. A method of producing a press-forming punch is also disclosed.

27 Claims, 16 Drawing Sheets

FIG. 12A
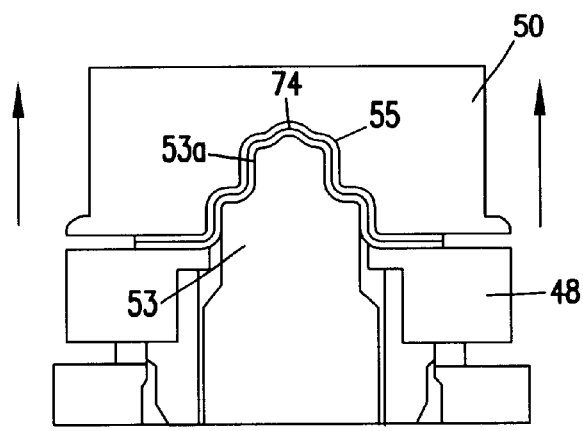
FIG. 12B
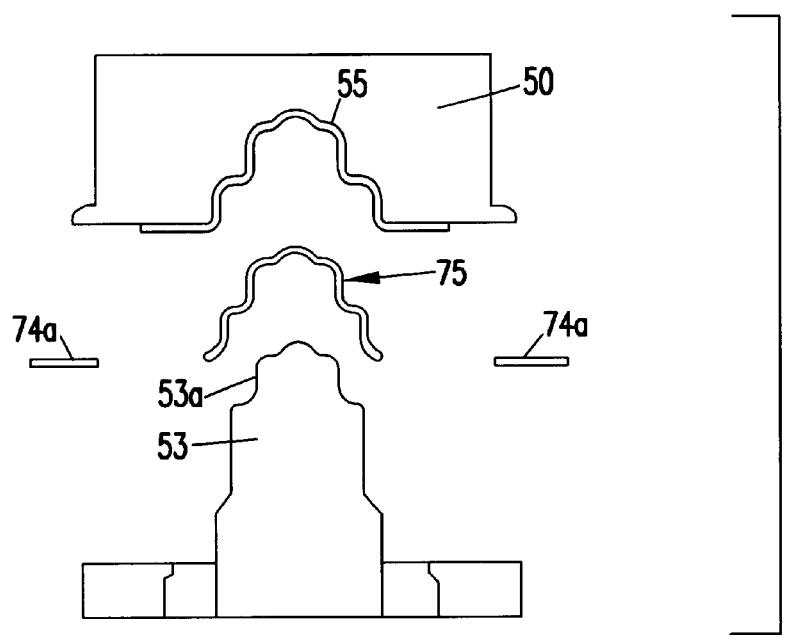
FIG. 12C
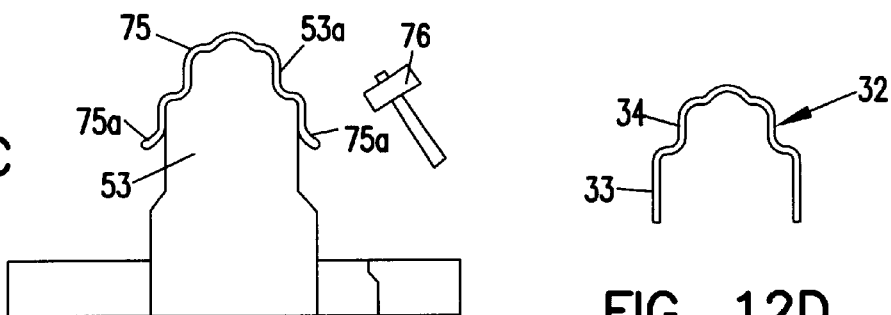
FIG. 12D

FIG. 13A
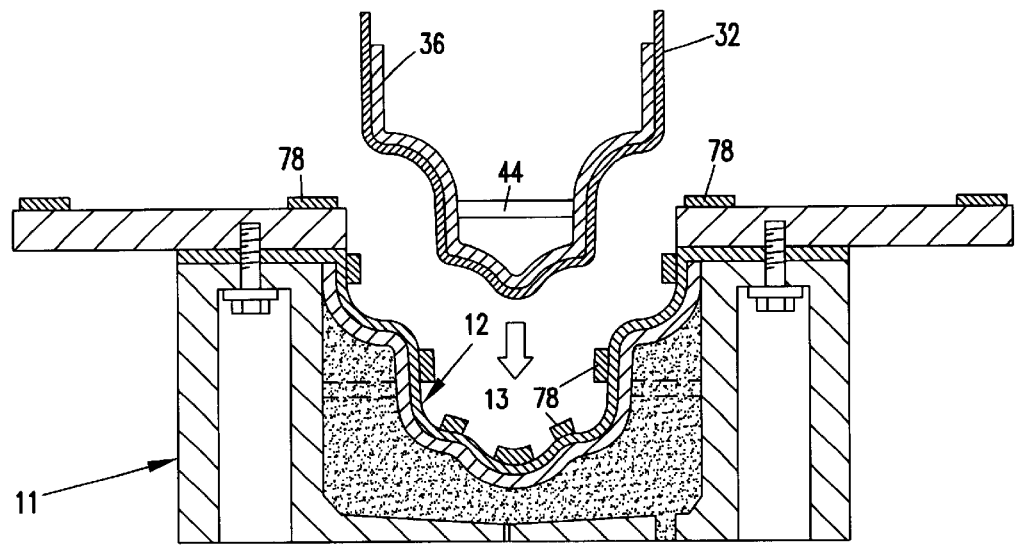
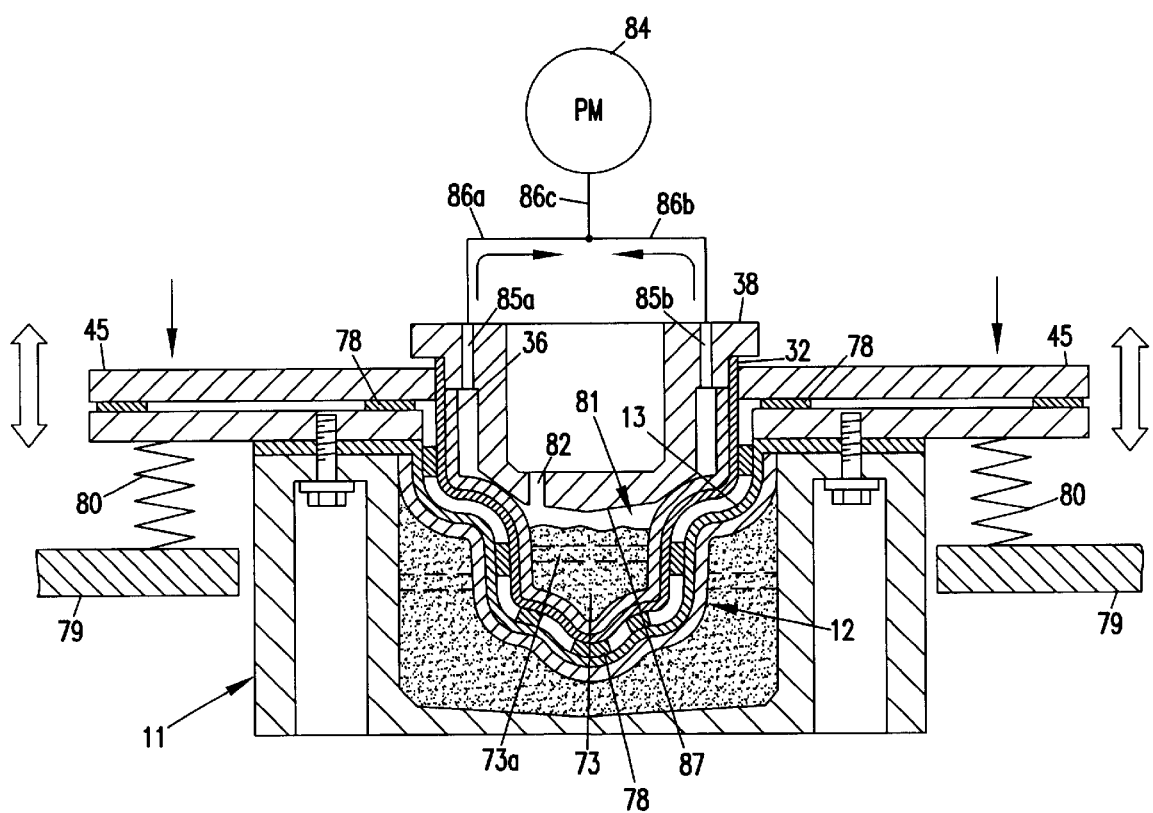
FIG. 13B

METHOD OF PRODUCING PRESS-FORMING PUNCH AND DIE

BACKGROUND OF THE INVENTION

1. Field of the Invention

This invention relates to a method of producing a cooperating pair of punch and die used for pressing-forming a blank material into a panel product.

2. Description of the Related Art various parts of a motor vehicle, such as a fuel tank of a motorcycle, are produced by press working. In the press working, a press-forming die assembly formed from a precision-machined alloy steel is used in general. The alloy steel press-forming die assembly is highly durable and hence is able to recover its manufacturing cost when used in mass manufacturing systems of vehicle parts.

In recent years, the model change cycle of motorcycles has become shorter than as before, and the manufacturing system tends to shift from mass manufacturing of one type of product to more flexible manufacturing of a wide variety of products with relatively low volume of production. The alloy steel press-forming die assembly, when used in flexible manufacturing systems, may sometimes fail to recover its manufacturing cost, leading to a cost-up of the final product.

With the foregoing problem in view, a press-forming die assembly formed from a synthetic resin is generally used for flexible manufacturing systems. The synthetic resin press-forming die assembly is relatively easy to manufacture and can be manufactured at a low cost as compared to the alloy steel press-forming die assembly. Accordingly, even when the model change cycle of the motorcycle is relatively short, the synthetic resin press-forming die assembly is able to recover its manufacturing cost and hence prevents a cost-up of the final product.

However, a working surfaces of the synthetic resin press-forming die assembly is softer than that of the alloy steel press-forming die assembly and hence is susceptible to wear in a relatively short period of use. Once wear occurs on the working surfaces, it is difficult to maintain the desired accuracies of the press-formed products. Accordingly, in order to maintain the desired product accuracies, the synthetic resin press-forming die assembly must be replaced before the working surface is worn away. With is requirement, the synthetic resin press-forming die assembly is replaced in a relatively short cycle and may sometimes fails to recover its manufacturing cost.

Another known relatively low-cost press-forming die assembly is made of a zinc alloy generally called "ZAS". The ZAS is a zinc-based alloy containing aluminum and antimony and hence has a relatively low melting pint such as about 380° C. Because of this low melting point, the ZAS press-forming die assembly can be manufactured at a relatively low cost.

However, a working surface of the ZAS press-forming die assembly is relatively soft and hence is poor in durability as compared to that of the alloy steel press-forming die assembly. Due to a relatively short replacement cycle, the ZAS press-forming die assembly may sometime fail to recover its manufacturing cost.

There has been a keen demand for a press-forming die assembly which can be manufactured at a reduced cost and has high durability comparable to that of the alloy steel press-forming die assembly.

SUMMARY OF THE INVENTION

It is accordingly an object of the present invention to provide a method of producing a highly durable press-forming die assembly (punch and die) at a relatively low cost.

According to a first aspect of the present invention, there is provided a method of producing a press-forming die, comprising the steps of: preparing a master die and a master punch relatively movable toward and away from each other so as to define therebetween a die cavity, the master die having a working surface partially defining the die cavity; while a first blank sheet is disposed between the master die and the master punch, relatively reciprocating the master die and the master punch together, thereby press-forming the first blank sheet into a press-formed panel complementary in contour to the shape of the die cavity; cutting down the working surface of the master die by a predetermined depth of cut; fitting the press-formed panel over the master punch; while a second blank sheet having a thickness equal to the predetermined depth of cut of the working surface is disposed between the master die and the press-formed panel fitted over the master punch, relatively reciprocating the master die and the master punch together, thereby press-forming the second blank sheet into a die panel complementary in contour to the shape of the press-formed sheet; and applying a back-up material to the rear surface of the die panel to thereby produce a press-forming die.

According to another aspect of the present invention, there is provided a method of producing a press-forming punch, comprising the steps of: preparing a master die and a master punch relatively movable toward and away from each other so as to define therebetween a die cavity, the master punch having a working surface partially defining the die cavity; while a first blank sheet is disposed between the master die and the master punch, relatively reciprocating the master die and the master punch together, thereby press-forming the first blank sheet into a press-formed panel complementary in contour to the shape of the die cavity; cutting down the working surface of the master punch by a predetermined depth of cut; fitting the press-formed panel in the master die; while a second blank sheet having a thickness equal to the predetermined depth of cut of the working surface is disposed between the master punch and the press-formed panel fitted in the master die, relatively reciprocating the master die and the master punch together, thereby press-forming the second blank sheet into a punch panel complementary in contour to the shape of the press-formed sheet; and applying a back-up material to the rear surface of the punch panel to thereby produce a press-forming punch.

According to a third aspect of the present invention, this provided a method of producing a press-forming punch and a press-forming die in succession, comprising the steps of: preparing a master die and a master punch relatively movable toward and away from each other so as to define therebetween a die cavity, the master die and punch having respective working surfaces jointly defining the die cavity while a first blank sheet is disposed between the master die and the master punch, relatively reciprocating the master die and the master punch together, thereby press-forming the first blank sheet into a press-formed panel complementary in contour to the shape of the die cavity, cutting down the working surface of the master punch by a predetermined depth of cut; fitting the press-formed panel in the master die; while a second blank sheet having a thickness equal to the predetermined depth of cut of the working surface is disposed between the master punch and the press-formed panel fitted in the master die, relatively reciprocating the master die and the master punch together, thereby press-forming the second blank sheet into a punch panel complementary in contour to the shape of the press-formed sheet; repeating the second-named reciprocating step to thereby produce a second punch panel; applying a back-up material to the rear surface of the first punch panel to thereby produce a press-forming punch; cutting down the working surface of the master die by a second predetermined depth of cut; fitting the second punch panel over the master punch; fitting the press-formed panel over the second punch panel; while a third blank sheet having a thickness equal to the second predetermined depth of cut of the working surface of the master die is disposed between the master die and the second punch panel fitted over the second punch panel, relatively reciprocating the master die and the master punch together, thereby press-forming the third blank sheet into a die panel complementary in contour to the shape of the press-formed sheet; and applying a back-up material to the rear surface of the die panel to thereby produce a press forming die.

It is preferable that the method comprises the additional step of applying a backing material to the rear surface of the die panel or the rear surface of the punch panel. The backing material comprises a water-soluble epoxy resin, and preferably a fibre-reinforced water-soluble epoxy resin.

The die panel or the punch panel is preferably made of steel, such as stainless steel or high-tensile steel, and has been subjected to work-hardening processes when press-formed from the corresponding blank sheet. The work-hardened die panel and punch panel have an increased surface hardening and hence they are highly resistant to wear.

The back-up material may be a high-strength cement or synthetic resin. When the high-strength cement is used, the applying step includes placing a slurry of high-strength cement on the rear surface of the die panel or the punch panel while removing bubbles from the slurry by the action of a vacuum. It is preferable that the applying step further includes applying vibrations to the slurry to promote separation of the bubbles from the slurry.

The above and other objects, features and advantages of the present invention will become manifest to those versed in the art upon making reference to the following description and accompanying sheets of drawings in which certain preferred structural embodiments incorporating the principle of the invention are shown by way of illustrative example.

BRIEF DESCRIPTION OF THE DRAWINGS

FIGS. 11B, and 12A to 12D are diagrammatical views illustrative of the manner in which a second blank sheet is press-formed into a die panel by and between the master die and punch;

FIGS. 13A, 13B and 14 are diagrammatical views illustrative of the manner in which a back-up material is applied to the rear surface of the die panel, thereby producing a press-forming die;

DETAILED DESCRIPTION OF THE PREFERRED EMBODIMENT

The following description is merely exemplary in nature and is in no way intended to limit the invention or its application or use.

Figure 1:
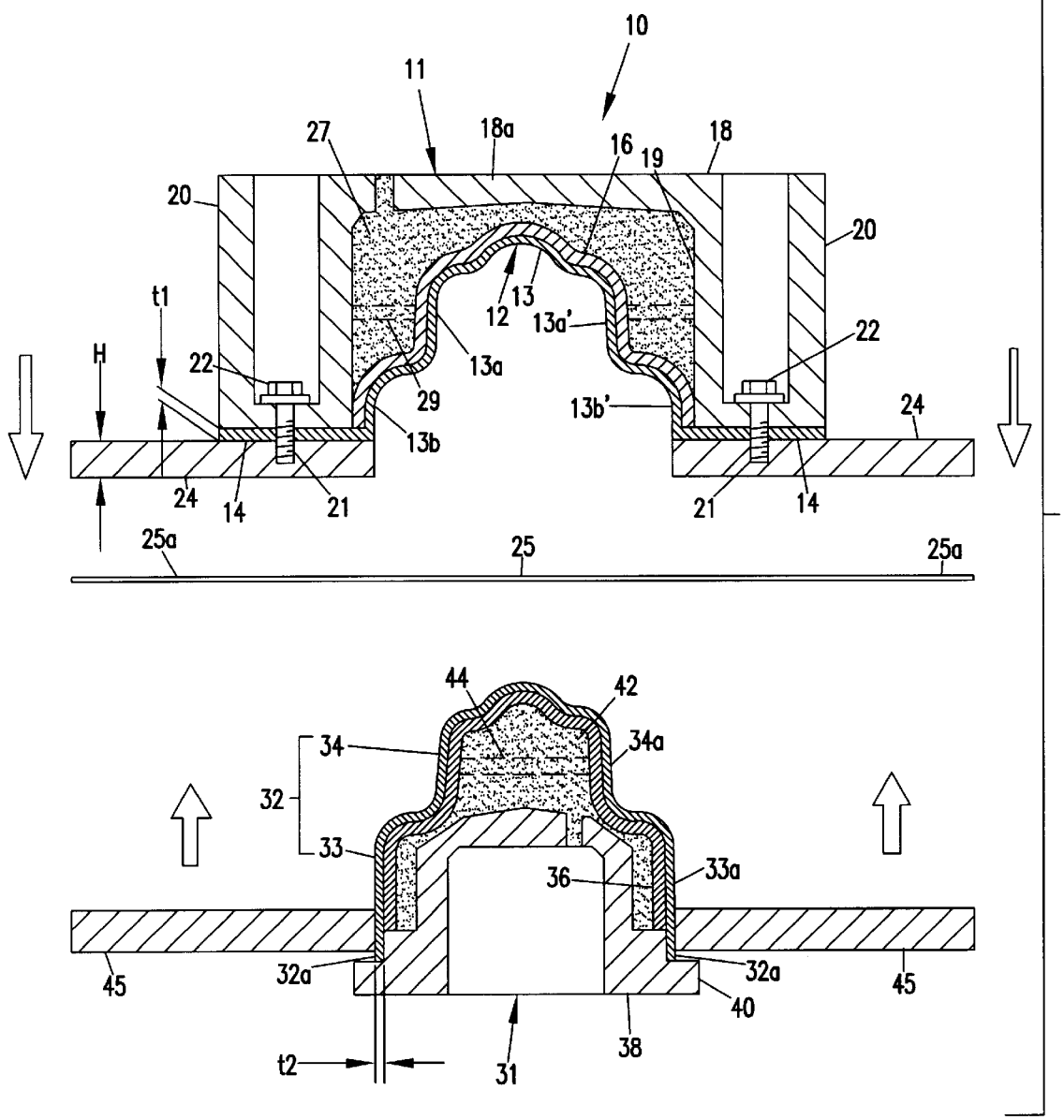
FIG. 1 is a vertical cross-sectional view of a press-forming die assembly produced in accordance with an embodiment of the present invention.

FIG. 1 shows, in vertical cross section, a press-forming die assembly 10 composed of an upper movable die 11 and a lower fixed punch 31. The die 11 is vertically movable toward and away from the punch 31 with a given reciprocating stroke. The die assembly 10 also includes a vertically movable hollow rectangular blank holder 45 disposed around the fixed punch 31 for a purpose described below. In the illustrated embodiment, the die assembly 10 is a drawing die assembly used for drawing a blank sheet 25 into a vehicle component, such as a fuel tank member of a motorcycle.

The die (drawing die) 11 is composed of a die panel 12 press-formed from a sheet material of high-tensile steel or stainless steel (having a thickness of 0.75 mm, for example), a backing material 16 underlying the die panel 12, a frame 18 to which the die panel 12 is attached, a hollow rectangular annular die face 24 secured to the front face of the frame 18 to attach the die panel 12 to the frame 18, and a back-up material 27 such as high-strength cement filled between the frame 18 and the backing material 16.

The die panel 12 has a recessed central portion 13 open downward, and a peripheral flange 14 extending around an open end of the recessed central portion 13. The peripheral flange 14 has a plurality of openings 12a for receiving bolts 22. The recessed central portion 13 has a stepped dome-like shape in transverse cross section including a narrow upper part 13a and a wide lower part 13b, each part having two opposed vertical walls 13a', 13b' extending parallel to the direction of movement of the die 11.

The backing material 16 is comprised of a fibre-reinforced water-soluble epoxy resin applied or otherwise coated on the rear surface of the recessed central portion 13 of the die panel 12 In application, a water-soluble epoxy resin is mixed up with short strands of glass fibre by using a mixer, then the mixture is coated on the rear surface of the die panel central portion 13 in a bubble-free state. After the mixture is cured, a fibre-reinforced epoxy resin backing material layer 16 is formed. Since the water-soluble epoxy resin has a high bonding strength and hence can firmly adhere to the rear surface of the die panel 12. In addition, since the front surface of the backing material 16 has undulations following the stepped dome-like configuration of the die panel recessed central portion 13, the backing material 16 exhibits good adhesion to the back-up material 27 (made, for example, of high-strength cement). The backing material 16 applied to the rear surface of the die panel 12 serves as a reinforcement of the die panel 12.

The frame 18 has a recessed central portion 19 for receiving therein the recessed central portion 13 of the die 11. The recessed central portion 19 is defined by and between a flat horizontal top plate 18a and a hollow rectangular vertical leg 20 formed integrally with an outer peripheral edge of the top plate 18a. The leg 20 has a plurality of bolt holes 21 (two being shown) through which a corresponding number of bolts 22 extend.

The hollow rectangular die face 24 is attached by the bolts 22 to the under surface of the leg 40 with the flange 14 firmly gripped between the leg 20 and the die face 24. The die face 24 cooperates with the blank holder 45 to grip or hold a peripheral edge portion 25a of the blank sheet 25 while the blank sheet 25 is pressed or drawn.

The back-up material 27 is made of a cured hydraulic high-strength cement placed to fill up a space between the frame 18 and the backing material 16. The back-up material 27 backs up or supports the die panel 12 from the rear side thereof. The high-strength cement may be replaced by a synthetic resin in which instance a molten synthetic resin is filled between the frame 18 and the backing material 16 and then cooled to cure.

Reference numeral 29 denotes positioning strips provided between the frame 18 and the recessed central portion 13 of the die plate 12 to keep the die plate central portion 13 in position against displacement during placement of the high-strength cement (back-up material) 27. After placement of the high-strength cement, the positioning strips 29 serve as a reinforcement of the back-up material 27.

The punch (drawing punch) 31 is comprised of a punch panel 32 press-formed from a blank sheet of high-strength steel or stainless steel (having a thickness of 0.75 mm, for example), a backing material 36 applied to the rear surface of the punch panel 32, a frame 38 to which the punch panel 32 is attached, and a back-up material 42 made of a high-strength cement placed between the frame 38 and the backing material 36.

The punch panel 32 has a shouldered dome-like shape in transverse cross section which is complementary in contour to the shape of the stepped recessed central portion 13 of the die panel 12. Thus, the punch panel 32 has a wide lower part 33 and a narrow upper part 34, each part having two opposed vertical walls 33a; 34a extending parallel to the direction of movement of the drawing die 11.

The backing material 36 is comprised of a fibre-reinforced water-soluble epoxy resin applied or otherwise coated on the rear surface of the punch panel 32 in the same manner as the backing material 16 of the drawing die 11w. As previously discussed, since the water-soluble epoxy resin has a high bonding strength and hence can firmly adhere to the rear surface of the punch panel 32. In addition, since the front surface of the backing material 36 has undulations following the shouldered dome-like configuration of the punch panel 32, the backing material 36 exhibits good adhesion to the back-up material 42 (made, for example, of high-strength cement). The backing material 36 applied to the rear surface of the punch panel 32 serves as a reinforcement of the punch panel 32.

The frame 38 has an inverted u shape in transverse cross section including upwardly projecting central portion received in a hollow interior of the dome-shaped punch panel 32. The frame 38 also has a flange 40 on which the punch panel 32 is supported with its lower end 32a being in abutment with an upper surface of the flange 40.

The back-up material 42 is made of a cured hydraulic high-strength cement set or otherwise placed between the frame 28 and the backing material 36. The back-up material 42 backs up or supports the punch panel 32 from the rear side thereof. The high-strength cement may be replaced by a synthetic resin in which instance a molten synthetic resin is filled between the frame 38 and the backing material 36 and then cooled to cure.

Reference numeral 44 denotes positioning strips (one being shown) placed in the hollow internal space of the backing material 36 so as to maintain the shape and dimensions of the punch panel 42 during placement of the high-strength cement between the backing material 36 and the frame 38. After placement of the high-strength cement, the positioning strips 44 serve as a reinforcement of the punch panel 32 and back-up material 36.

The hollow rectangular blank holder 45 is vertically movably disposed around the drawing punch 31 in confronting relation to the die face 24 of the drawing die 11. In a drawing operation, the blank holder 45 cooperates with the die face 24 to grip or hold the peripheral portion 25a of the blank sheet 25 so as to prevent generation of wrinkles on any part of the blank sheet 25 being drawn.

In the drawing die assembly 10, the die panel 12 and the punch panel 32 are both formed by press working. This enables the use of a sheet metal with high surface hardness, such as high-strength steel or stainless steel, in forming the die and punch panels 12 and 32. The die and punch panels 12 and 32 thus press-formed from such sheet metal have highly durable working surfaces with the result that the drawing die and punch 11 and 31 as a whole have good durability.

Furthermore, the die panel 12 and the punch panel 32 both made of metal can be plated or otherwise coated with a layer of hard chromium when a higher surface hardness is needed. The cement and synthetic resin that can be used to form the back-up materials 27, 42 are relatively inexpensive and hence do not increase the manufacturing cost of the drawing die and punch 11 and 31.

The drawing die assembly 10 operates as follows. The upper die 11 is normally disposed in its uppermost standby position. The blank holder 45 is moved upward until an upper surface of the blank holder 45 is in flash with the top of the punch plate 32. After a blank sheet 25 is placed on the blank holder 45, the die 11 is descended toward the punch 31.

Downward movement of the die 11 first causes a peripheral portion 25a of the blank sheet 25 to be gripped by and between the die face 24 and the blank holder 45. As the downward movement of the die 11 continues, the material of a central portion of the blank sheet 25 is deformed or otherwise drawn by and between the die panel 12 and the punch panel 32 while the peripheral portion 25a is continuously gripped. When the die 11 reaches its lowermost working position, the material of the central blank sheet portion has been drawn into a shape complementary in contour to the shape of a cavity defined between the die panel 12 and the punch panel 32.

Figure 2:
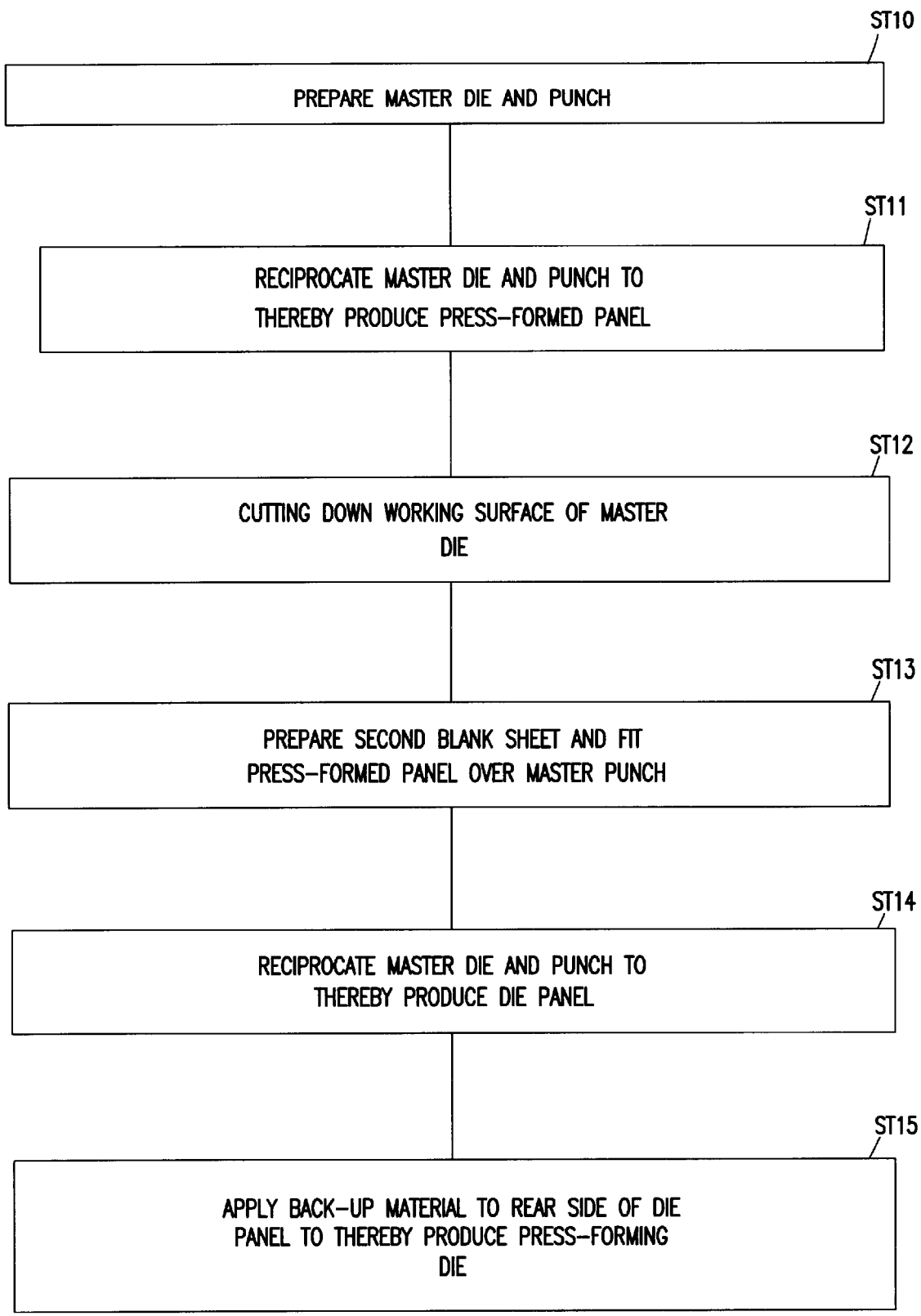
FIG. 2 is a flowchart showing a sequence of operations achieved to produce a press-forming die of the die assembly according to the present invention.

Then, a method of producing the drawing die assembly 10 shown in FIG. 1 will be described with reference to FIGS. 2 to 14. Referring now to FIG. 2, there is shown a flowchart illustrative of a sequence of operations achieved to produce the die 11 of the drawing die assembly 10.

Figure 3A:
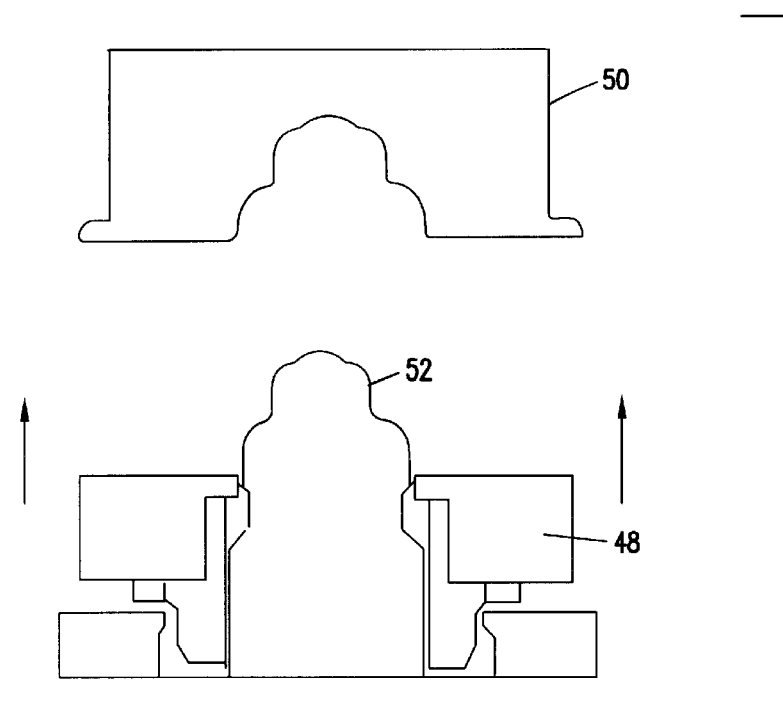
FIGS. 3A–3B and 4A–4B are diagrammatical views illustrative of the manner in which a first blank sheet is press-formed into a press-formed panel by and between a master die and a master punch.

At a first step (ST10), a master die 50 and a master punch 52 are prepared, as shown in FIG. 3A. The master die 50 and master punch 52 jointly define therebetween a die cavity complementary in contour to the shape of a punch panel 32 (FIG. 1) to be produced. The master die 50 and the master punch 52 each have a working surface defining part of the die cavity. The master punch 52 is associated with a vertically movable blank holder 48. Though not shown, the master die 50 is attached to the ram of a press machine and the master punch 52 and the blank holder 48 are set on the table of the press machine below the master die 50. The master die 50 and the master punch 52 are formed from a relatively soft material such as ZAS, or synthetic resin. Use of such material facilitates easy manufacture of the master die and punch 50 and 52.

Figure 3B:
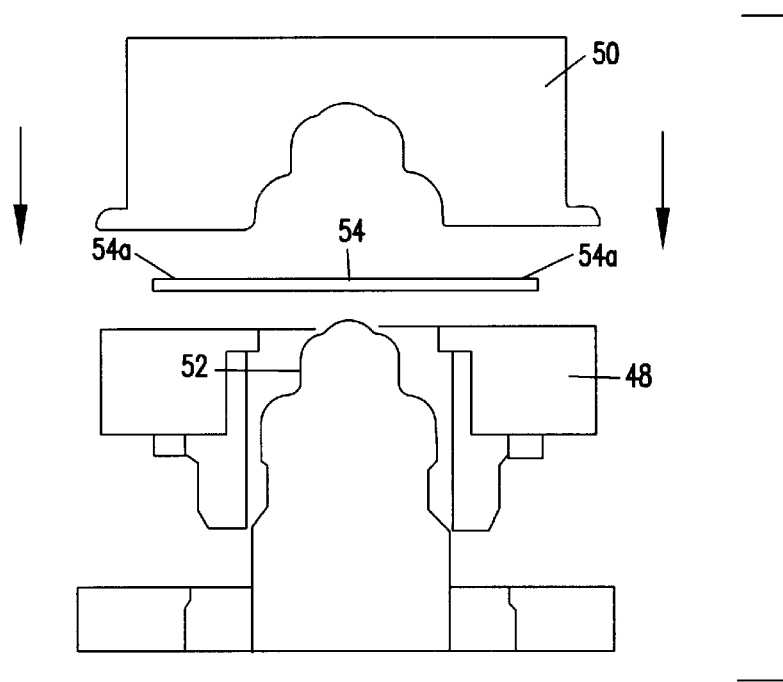
Figure 4A:
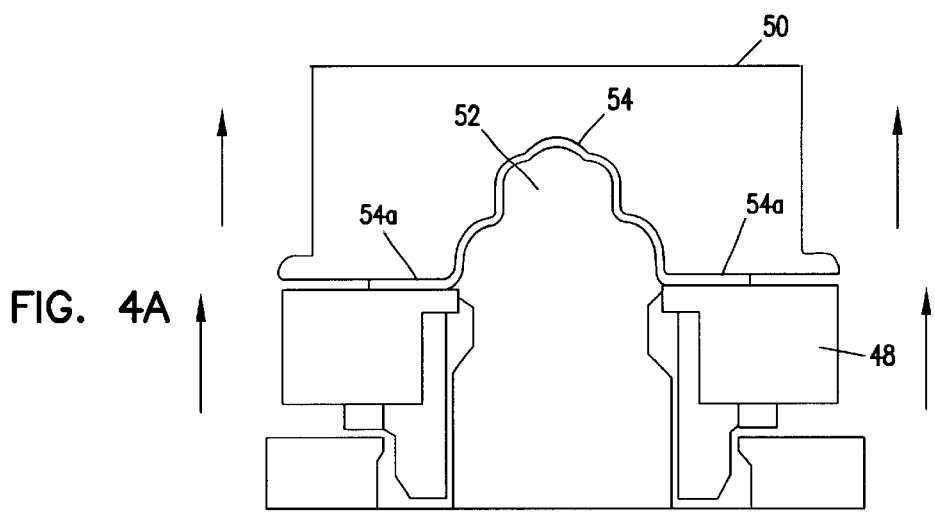
Figure 4B:
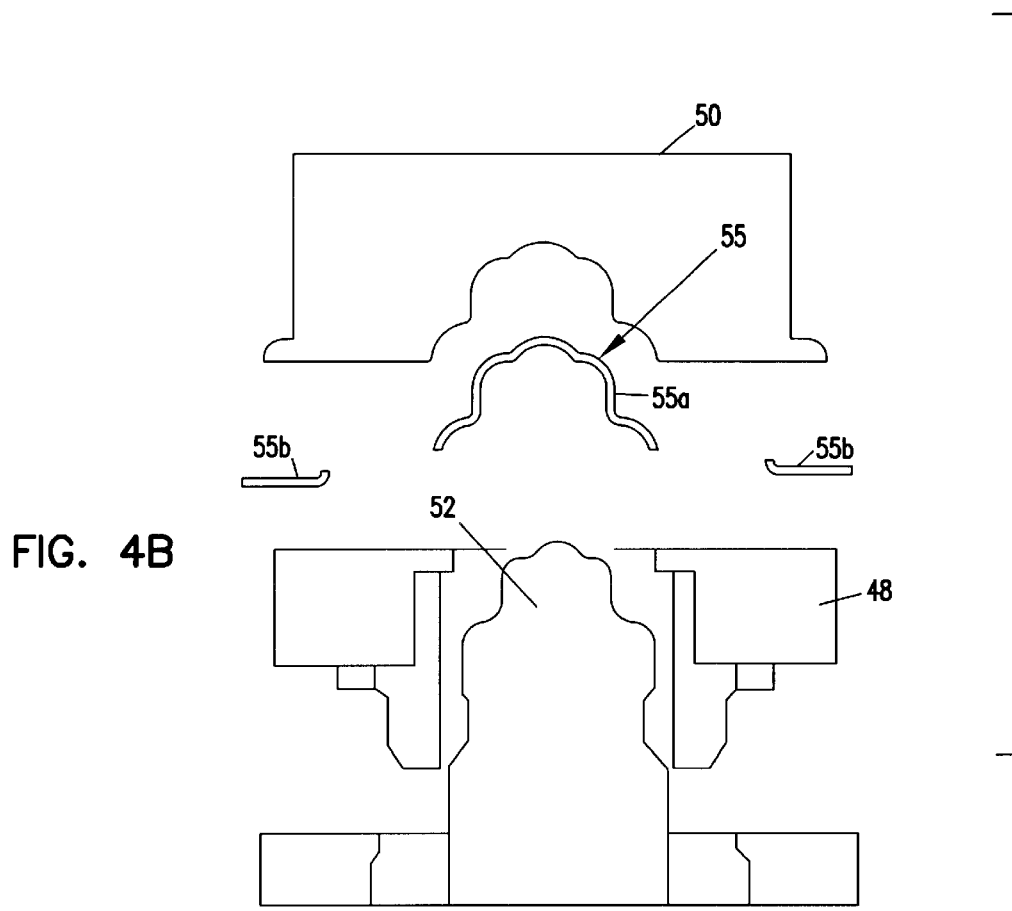

Subsequently, at a second step (ST11 shown in FIG. 2), the blank holder 48 moves upward to an operating position, as shown in FIG. 3B. After a first blank sheet 54 is placed between the master die 50 and the master punch 52, the master die 50 is descended toward the master punch 52 so that the blank sheet 54 is press-formed into a press-formed panel blank by and between the master die 50 and punch 52 with the peripheral portion 54a being gripped between the blank holder 48 and the die face 24 (FIG. 1), as shown in FIG. 4A. Then, after the master die 50 and the blank holder 48 are ascended, the press-formed panel blank 55 is removed from the press machine, followed by a press-cutting operation in which a flange 55b of the press-formed panel blank 55 is removed, as shown in FIG. 4B. A press-formed panel 55a is thus produced.

Figure 5A:
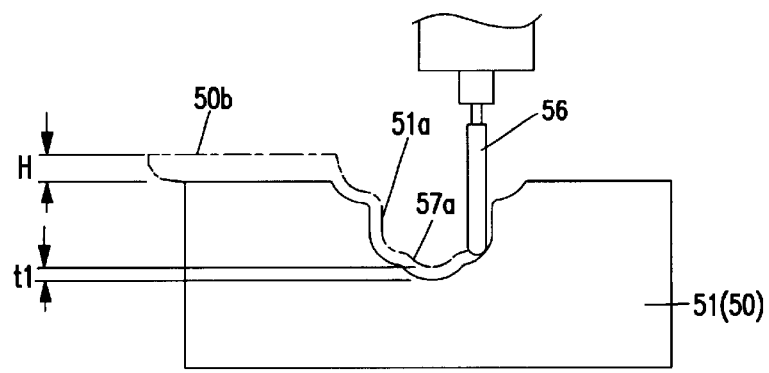
FIG. 5A is a diagrammatical view illustrative of the manner in which the working surface of the master die is cut away by a predetermined thickness.

At a third step (ST12 shown in FIG. 2), the master die 50 is reversed so that the working surface 50a faces upward, and the working surface 50a is cut down by a predetermined cutting depth t1 by means of a cutter 56, as shown in FIG. 5A. In this instance, the front surface 50B extending around the working surface 50a of the master die 50 is also cut down by a predetermined thickness E which is equal to the thickness of the die face 24 (FIG. 1). By the cutting operation thus achieved, a master die 51 having a working surface 51a is obtained. Since the working surface 50a is cut down by the predetermined thickness t1 to produce the working surface 51a, a die cavity partially defined by the working surface 51a can accommodate the die panel 12 (FIG. 1). In the cutting operation, data about three dimensional machining used for preparing the master die 50 are utilized, so that no additional programing work is needed for achieving the cutting operation. The cutting operation may be carried out by using a profiling or copying machine.

Then, at a fourth step (ST13 shown in FIG. 2), spacer blocks 58 are disposed between a base portion 52a of the master punch 52 and the blank holder 48, as shown in FIG. 5E. The spacer blocks 58 have the same thickness H as the die face 24 (FIG. 1).

Figure 5B:
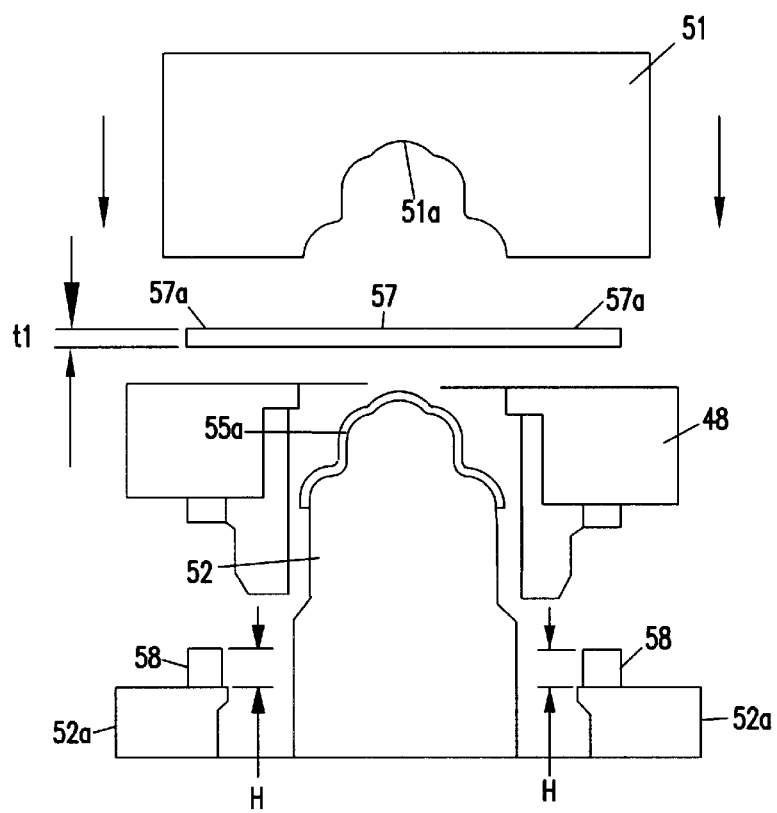
FIGS. 5B, 6A and 6B are diagrammatical views illustrative of the manner in which a second blank sheet is press-formed into a die panel by and between the master die and punch.
Figure 6A:
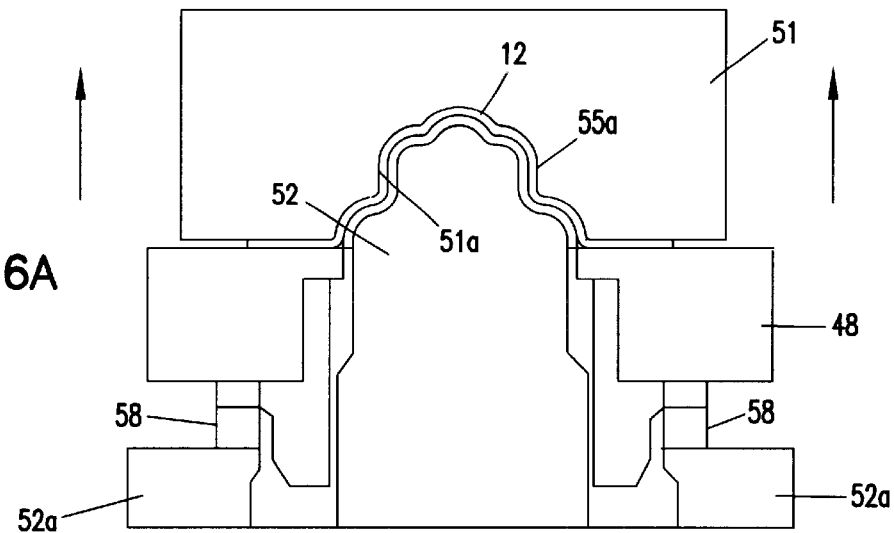

A second blank sheet 57 having a thickness t1 equal to the above-mentioned cutting depth t1 of the working surface 50a (FIG. 5A) is prepared, and the press-formed panel 55a is fitted over the master punch 52, Subsequently, at a fifth step (ST14 shown in FIG. 2), the second blank sheet 57 is placed between the master die 51 and the master punch 52, as shown in FIG. 5B, and the master die 51 is then lowered toward the master punch 52 with the press-formed panel 55a being fit over the master punch 52 whereby the second blank sheet 57 is press-formed into a die panel 12, as shown in FIG. 6A. Since the front surface including the working surface 51a of the master die 51 has been cut down as described above, the second blank sheet 57 is plastically deformed into a profile complemental to the profile of the press-formed panel 55a as it is forced between the press-formed panel 55a and the working surface 51a of the master die 51.

Since the spacer blocks 58 having the same thickness as the die face 24 (FIG. 1) are disposed on the base portion 52a of the master punch 52, a flange 14 of the die panel 12 can be assembled between the die face 24 and the frame 18, as shown in FIG. 1.

During the press-forming operation, a central portion of the second blank sheet 57 is accommodated in a die cavity defined between the working surface 51a of the master die 51 and the press-formed panel 55 fitted over the master punch 52. This prevents the master die and punch 51 and 52 from being damaged or otherwise broken and also ensures that the second blank sheet 57 is press-formed into a desired shape even when a final press-formed panel-like product has a rectilinear portion extending parallel to the axis of relative movement of the master die and punch 51 and 52.

Figure 6B:
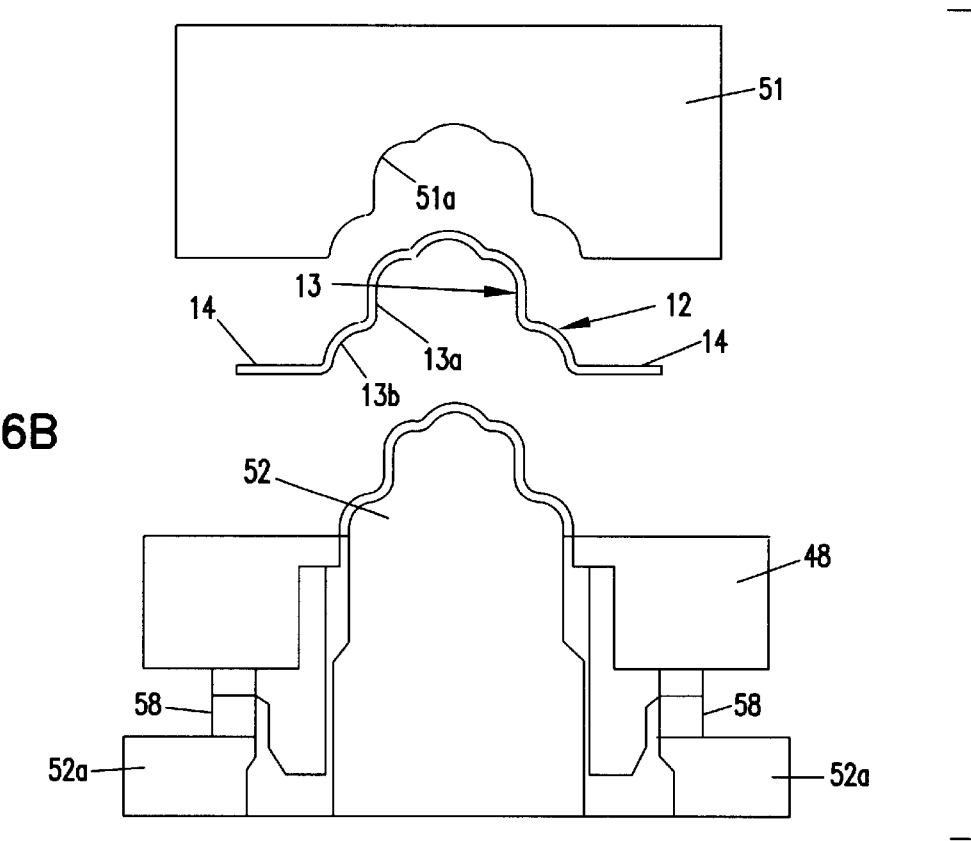

Then, the master die 51 is ascended, the die panel 12 is removed, as shown in FIG. 6B.

Figure 7A:
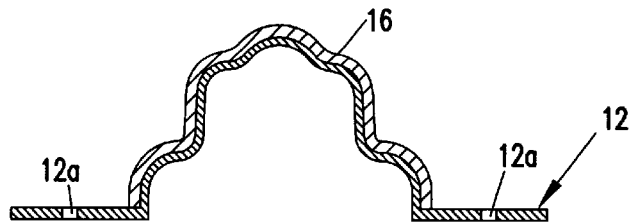
FIG. 7A is a diagrammatical view illustrative of the manner in which an elastic material is applied to one surface of the die panel.
Figure 7B:
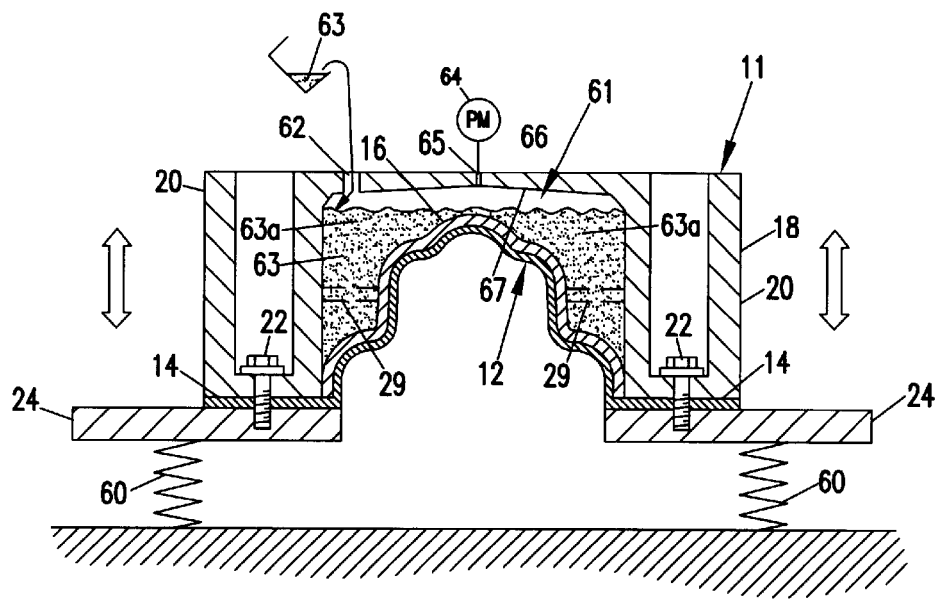
FIGS. 7B and 7C are diagrammatical views illustrative of the manner in which a back-up material is applied to the rear surface of the die panel, thereby producing a press-forming die.

Subsequently; at a sixth step (ST15 shown in FIG. 2), a backing material 16 is applied to the rear surface of the die panel 12, as shown in FIG. 7A. The die panel 12 is set on the frame 18 with the flange 14 being gripped between the leg 20 of the frame 18 and the die face 24, and the die face 24 is fastened by the bolts 22 to the leg 20. The die panel 12 is thus attached to the frame 18, as shown in FIG. 7B. Thereafter, positioning and reinforcing strips 29 are attached between the frame 18 and the die panel 12. After the frame 18 and the die panel 12 held therein are placed on a vibrator (schematically illustrated in the form of springs) 60, the vibrator 60 is driven to vertically shake or oscillate the frame 18 and the die panel 12. While keeping this condition, a slurry of high-strength cement 63 is set or placed in a space 61 defined between the frame 18 and the die panel 12 (backing material 16).

To this end, the frame 18 has an opening 62 from which the cement slurry 63 is supplied. While the cement slurry 63 is placed, the positioning and reinforcing strips 29 keep the die panel 12 in position against displacement relative to the frame The high-strength cement slurry 63 is preferably a mixture of high-strength cement, metal fiber and water reducing agent homogeneously mixed up in a vacuum mixer (not shown) at the ratio of 100:10:5. The metal fiber increases the strength of the high-strength cement 63, and the water reducing agent can speed up the solidification of the cement 63. Additionally, the metal fiber and water reducing agent can diminish contraction of the cement while being solidified.

Simultaneous with placing of the high-strength cement slurry 63 into the space 61, a vacuum pump 64 (FIG. 9B) is driven to remove bubbles 63a from the high-strength cement 63.

By driving the vacuum pump 64, the space 61 is evacuated so that air bubbles 63a contained in the cement slurry 63 are drawn into the space 61. In this instance, vertical vibration applied from the vibrator 60 through the frame 18 and die panel 12 to the cement slurry 63 being placed promotes separation of the air bubbles 63a from the cement slurry 63. The combination of the vacuum action and vibratory movement insures complete deaeration of the cement slurry 63.

Air collected in the space 61 is socked through an outlet 65 and a conduit 66 into the vacuum pump 64 and discharged to the outside air. During that time, air inside the space 61 is smoothly guided into the outlet 65 because a conical upper inside surface 67 of the frame 18 is shaped to converge to the outlet 65. This improves the evacuation efficiency.

Figure 7C:
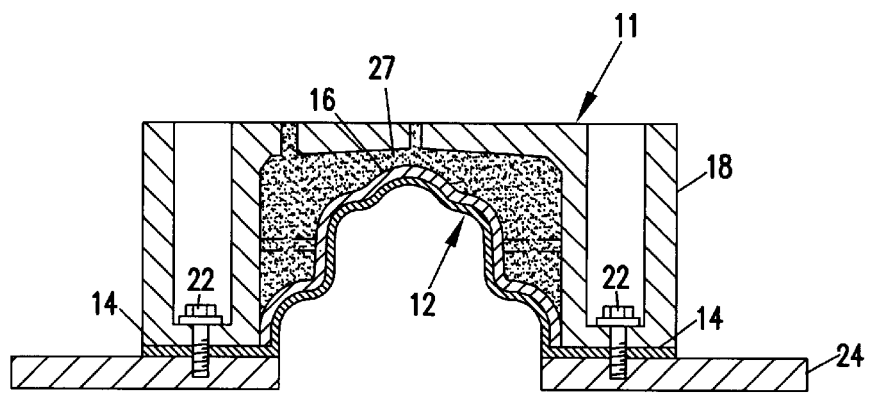

When the high-strength cement 63 (FIG. 7B) placed in the space 61 is solidified, a back-up material 27 is formed, as shown in FIG. 7C. A press-forming die 11 is thus produced.

Since the high-strength cement 63 being placed is deaerated, the back-up material 27 is completely free from cavities and hence has high durability. This increases the durability of the press-forming die 11 as a whole.

According to the method as described above, the working surface 50a of the master die 50 is cut down by a predetermined cutting depth so that a cut working surface 51a and the press-formed panel 55a fitted over the master punch 52 can define therebetween a space or die cavity capable of accommodating within it a die panel 12 press-formed from the second blank sheet 57. The die panel 12 is then backed up with a back-up material 27 whereby a press-forming die 11 is produced. It will be appreciated that the press-forming die 11 can be easily produced as compared by the conventional die because the working surface of the die panel 12 can be produced without using a conventional cutting process as done on a numerically controlled working machine or a profiling machine.

Figure 8:
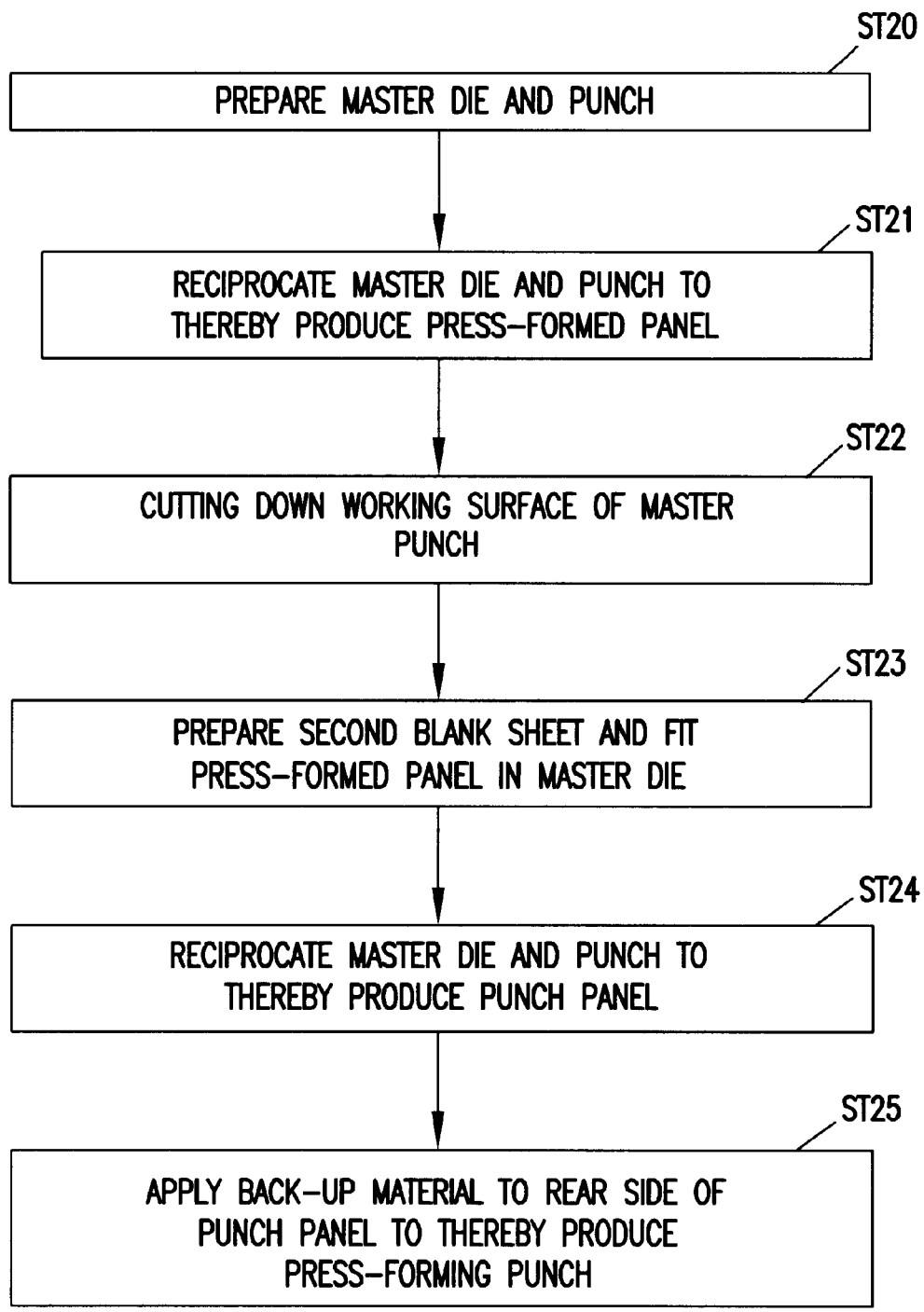
FIG. 8 is a flowchart showing a sequence of operations achieved to produce a press-forming punch according to the present invention.

The press-forming punch 31 of the drawing die assembly 10 is produced according to a method as schematically shown in the flowchart shown in FIG. 8.

Figure 9A:
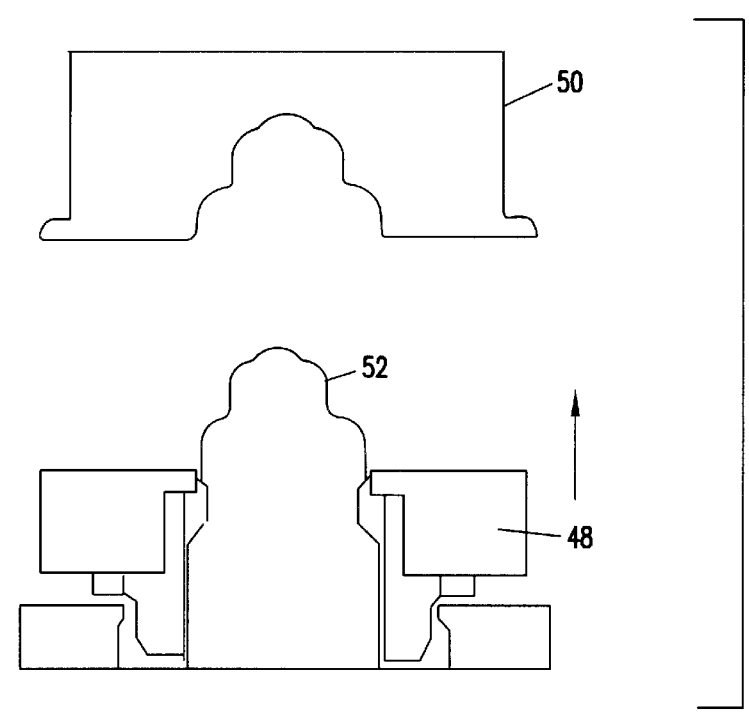
FIGS. 9A–9B and 10A–10B are diagrammatical view illustrative of the manner in which a first blank material is press-formed into a press-formed panel by and between the master die and punch.

At a first step (ST20), a master die 50 and a master punch 52 are prepared, as shown in FIG. 9A. The master die 50 and master punch 52 jointly define therebetween a die cavity complementary in contour to the shape of a die, panel 12 (FIG. 1) to be produced. The master die 50 and the master punch 52 each have a working surface defining part of the die cavity. The master punch 52 is associated with a vertically movable blank holder 48. Though not shown, the master die 50 is attached to the ram of a press machine and the master punch 52 and the blank holder 48 are set on the table of the press machine below the master die 50. The master die 50 and the master punch 52 are formed from a relatively soft material such as ZAS, or synthetic resin. Use of such material facilitates easy manufacture of the master die and punch 50 and 52.

Figure 9B:
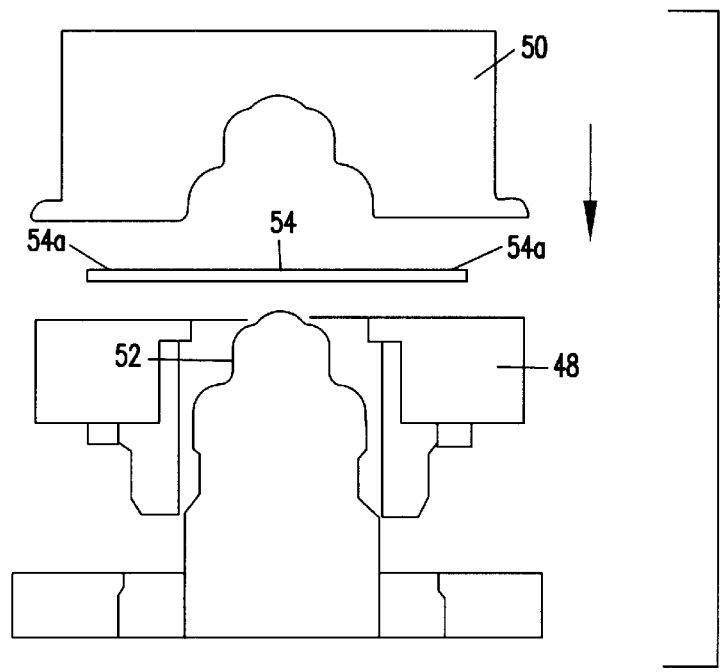
Figure 10A:
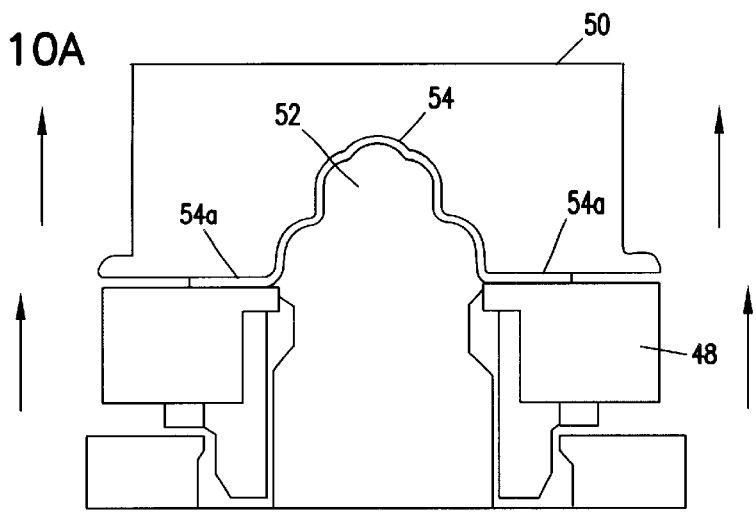
Figure 10B:
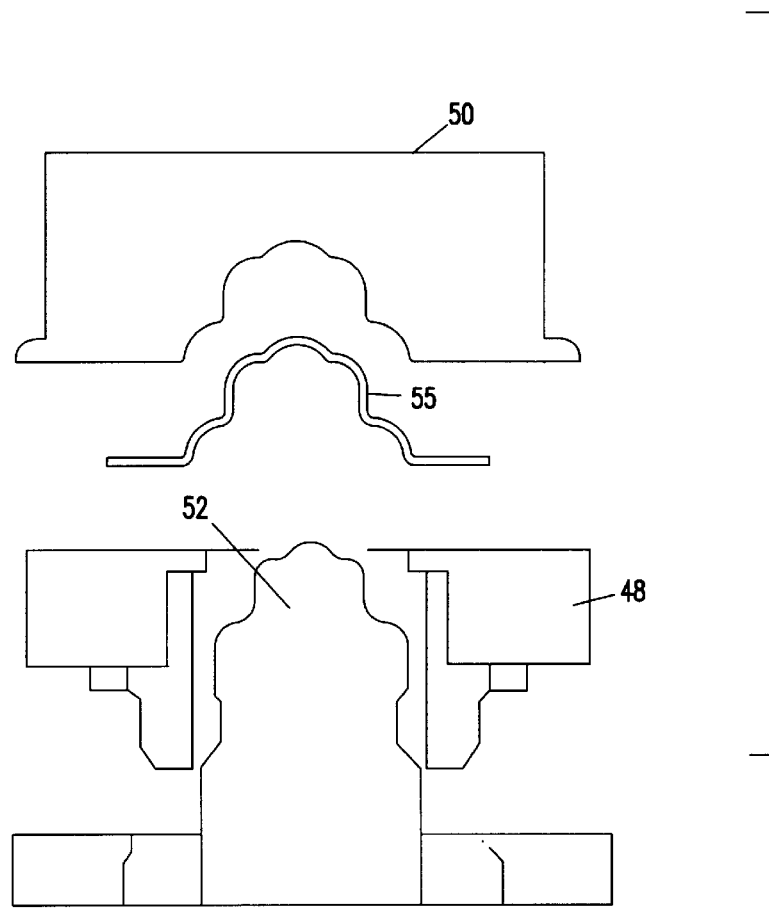

Subsequently, at a second step (ST21 shown in FIG. 8), the blank holder 48 moves upward to an operating position, as shown in FIG. 9B. After a first blank sheet 54 is placed between the master die 50 and the master punch 52, the master die 50 is descended toward the master punch 52 so that the blank sheet 54 is press-formed into a press-formed panel 55 (FIG. 10B) by and between the master die 50 and punch 52 with the peripheral portion 54a being gripped between the blank holder 48 and the die face 24 (FIG 1), as shown in FIG. 10A. Then, after the master die 50 and the blank holder 48 are ascended, the press-formed panel 55 is removed from the press machine, as shown in FIG. 10B.

Figure 11A:
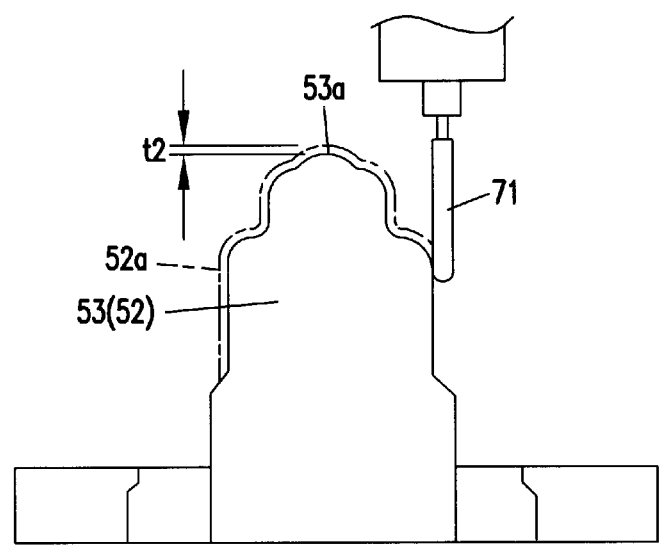
FIG. 11A is a diagrammatical view illustrative of the manner in which the working surface of the master punch is cut away by a predetermined thickness.

At a third step (ST22 shown in FIG. 8), the working surface 52a of the master punch 52 is cut down by a predetermined cutting depth t2 by means of a cutter 71, as shown in FIG. 11A. By the cutting operation thus achieved, a master punch 53 having a working surface 53a is obtained. Since the working surface 52a is cut down by the predetermined thickness (cutting depth) t2 to produce the working surface 53a, a die cavity partially defined by the working surface 51a can accommodate the punch panel 32 (FIG. 1). In the cutting operation, data about three dimensional machining used for preparing the master punch 52 are utilized, so that no additional programing work is needed for achieving the cutting operation. The cutting operation may be carried out by using a profiling or copying machine.

Then, at a fourth step (ST23 shown in FIG. 8), a second blank sheet 72 having a thickness equal to the above-mentioned cutting depth t2 of the working surface 52a (FIG. 11A) is prepared, and the press-formed panel 55 is fitted over the front surface of the master die 50.

Figure 11B:
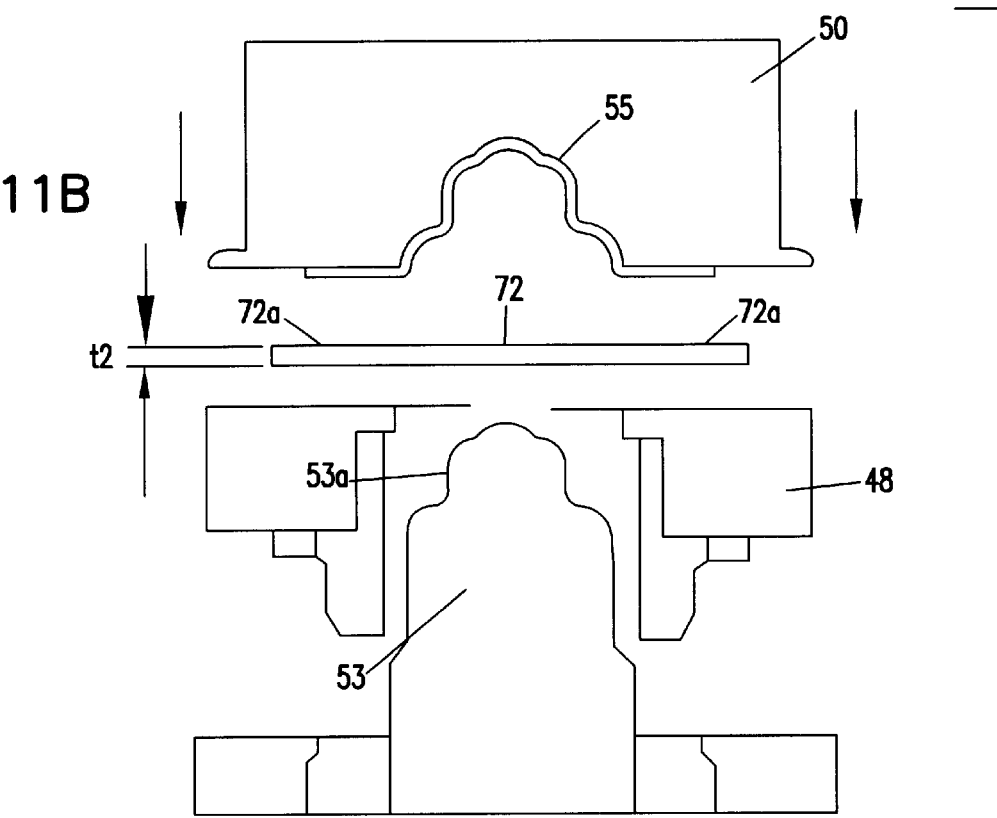

Subsequently, at a fifth step (ST24 shown in FIG. 8), the second blank sheet 71 is placed between the master die 50 and the master punch 53, as shown in FIG. 11B, and the master die 50 is then lowered toward the master punch 53 with the press-formed panel 55 being fit over the front surface of the master punch 50 whereby the second blank sheet 71 is press-formed into a press-formed 74, as shown in FIG. 12A. During the press-forming operation, a central portion of the second blank sheet 72 is accommodated in a space or die cavity defined between the working surface 53a of the master punch 53 and the press-formed panel 55 fitted over the master die 50. This prevents the master die and punch 50 and 53 from being damaged or otherwise broken and also ensures that the second blank sheet 57 is press-formed into a desired shape even when a final press-formed panel-like product has a rectilinear portion extending parallel to the axis of relative movement of the master die and punch 50 and 53.

Then, the master die 50 is ascended, the press-formed panel 74 is removed, and after that a flange 74a of the press-formed panel 74 is removed by die-cutting, for example, as shown in FIG. 11B, whereby a flange-free press-formed panel 75 is produced.

Thereafter, the press-formed panel 75 is fitted over the working surface 53a of the master punch 53, and using a suitable tool such as a hammer 76, a radially outwardly projecting lower edge 75a of the press-formed panel 75 is made parallel to a vertically extending portion of the working surface 53a of the master punch 53, as shown in FIG. 12C. A punch panel 32 such as shown in FIG. 12D is thus obtained.

Subsequently, at a sixth step (ST25 shown in FIG. 8), the press-forming die 11 is placed on a table (not shown) with the die panel 12 facing upward, as shown in FIG. 13A. Then, shims 78 having the same thickness as a final panel-like product (not shown) are properly attached to a recessed working surface 13 and the die face 24. The shims 78 may be replaced by a final panel-like product.

Thereafter, a backing material 36 such as urethane rubber is attached to the rear surface of the punch panel 32, and positioning and reinforcing strips 44 are then set on the back of the punch panel 32, as shown in FIG. 13A. The punch panel 32 is subsequently moved toward the press-forming die 11.

As shown in FIG. 13B, the punch panel 32 is placed on the recessed working surface 13 via the shims 78, a blank holder 45 is set on the die face 24 via the shims 78, and a frame 38 is set on the punch panel 32, as shown in FIG. 13B. In this instance, the punch panel 32 is held immovable by the blank holder 45. Thus, the punch panel 32 and the frame 38 are set on the press-forming die 11.

The press-forming die 11 carrying thereon the punch panel 32 and frame 38 is set on a vibrator schematically illustrated in the form of springs 80 acting between the press-forming die 11 and a horizontal table 79. The vibrator 80 is driven to shake or oscillate the press-forming die 11, press panel 32 and frame 38 in the vertical direction. While keeping this condition, a slurry of high-strength cement 73 is set or placed in a space 81 defined between the frame 38 and the punch panel 32 (backing material 36). To this end, the frame 38 has an opening 82 from which the cement slurry 73 is supplied. While the cement slurry 73 is placed, the positioning and reinforcing strips 44 (FIG. 13A) keep the punch panel 32 in position against displacement relative to the frame 38.

Simultaneous with placing of the high-strength cement slurry 73 into the space 81, a vacuum pump 84 (FIG. 9B) is driven to remove babbles 73a from the high-strength cement 73.

By driving the vacuum pump 84, the space 81 is evacuated so that air bubbles 73a contained in the cement slurry 73 are drawn into the space 71. In this instance, vertical vibration applied from the vibrator 80 through the frame 38 and punch panel 32 to the cement slurry 73 promotes separation of the air bubbles 73a from the cement slurry 73. The combination of the vacuum action and vibratory movement insures complete deaeration of the cement slurry 73.

Air collected in the space 81 is sucked through outlets 85a, 85b and 86a–86c into the vacuum pump 84 and then discharged to the outside air. During that time, air inside the space 81 is smoothly guided into the outlet 85a, 85b because a conical upper inside surface 87 of the frame 38 is shaped to diverge toward an outer peripheral surface of the frame in which the outlets 85a, 85b are located. This improves the evacuation efficiency.

Figure 14:
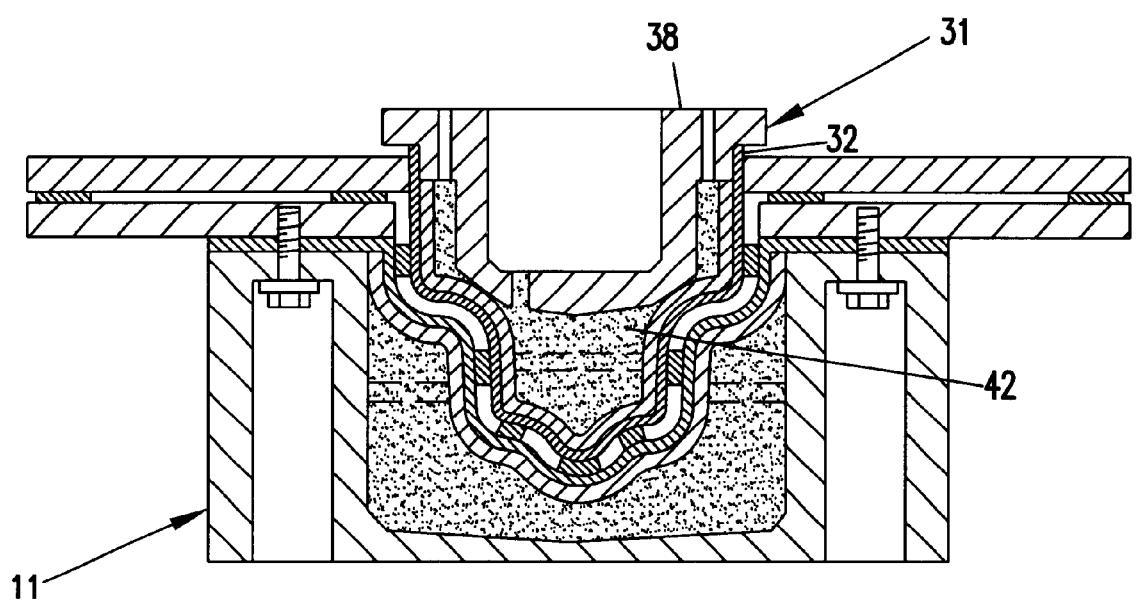

When the high-strength cement 73 (FIG. 13B) placed in the space. 81 is solidified, a back-up material 42 is formed, as shown in FIG. 14. A press-forming punch 31 is thus produced.

Since the high-strength cement 73 being placed is deaerated, the back-up material 42 is completely free from cavities and hence has high durability. This increases the durability of the press-forming punch 31 as a whole. In addition, since the punch panel 32 and the frame 38 set on the press-forming die 11 is stable in position, placement of the high-strength cement can be achieved with utmost ease.

According to the method as described above, the working surface 52a of the master die 52 is cut down by a predetermined cutting depth so that a cut working surface 53a and the press-formed panel 55 fitted over the master die 50 can define therebetween a space or die cavity capable of accommodating within it a punch panel 32 press-formed from the second blank sheet 72. The punch panel 32 is then backed up with a back-up material 42 whereby a press-forming punch 31 is produced. It will be appreciated that the press-forming punch 31 can be easily produced as compared by the conventional punch because the working surface of the punch panel 32 can be produced without using a conventional cutting process as done on a numerically controlled working machine or a profiling machine.

Figure 15A:
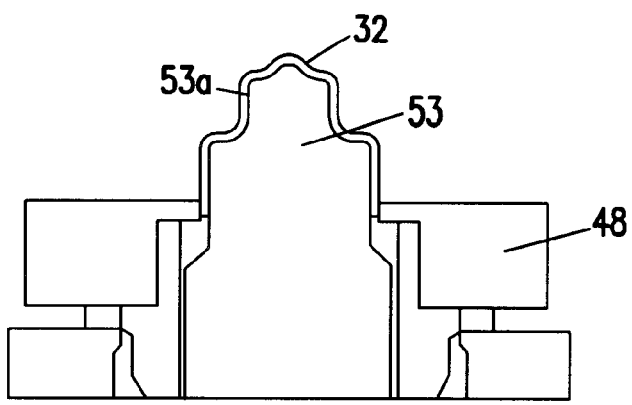
FIGS. 15A to 15C are diagrammatical views showing a modification which enables consecutive production of a press-forming punch and a press-forming die according to the present invention.
Figure 15B:
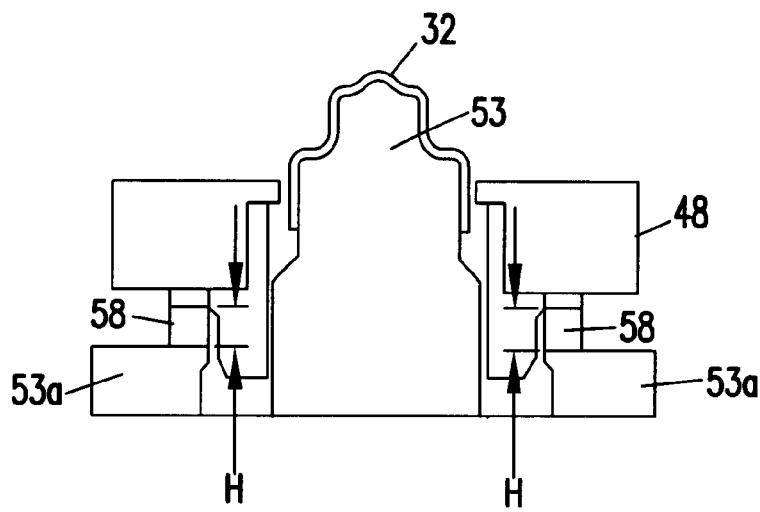
Figure 15C:
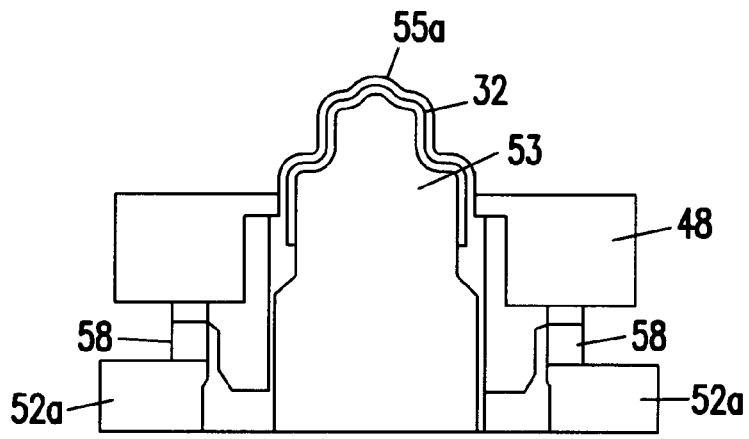

FIGS. 15A to 15C a modification of the above-mentioned processes according to the present invention.

Using the master punch 53 having a working surface 53a formed by cutting down the working surface 52a of the master punch 52 as described above with reference to FIG. 11A, a punch panel 32 such as shown in FIG. 12D produced by the fifth step ST24 shown in FIG. 8 is fitted over the working surface 53a of the master punch 53. The punch panel 32 thus set on the working surface 53a has the same profile as the working surface 52a (FIG. 4B) of the master punch 52 before being subjected to the cutting process.

Then, spacer blocks 58 are disposed between a base portion 53a of the master punch 53 and a blank holder 48 associated with the master punch 53, as shown in FIG. 15B Subsequently, the press-formed panel 55a previously formed the process shown in FIG. 4B is fitted over the punch panel 32, as shown in FIG. 15C. This condition is substantially the same as the condition shown in FIG. 5B.

Thereafter, consecutive operational steps shown FIGS. 5A to FIG. 7C are carried out, so that a press-forming die 11 such as shown in FIG. 7C is obtained.

The modified process ensures that a press-forming punch and a press-forming die are produced in succession. In the process for producing the press-forming punch, two punch panels 32 are produced. One punch panel 32 is used for producing the press-forming punch 31, and the other punch panel 32 is used for producing the press-forming die 11. Since only one cooperating pair of master die and punch is necessary to produce a cooperating pair of press-forming die and punch, the manufacturing cost of the press-forming die assembly can be considerably reduced.

Figure 16A:
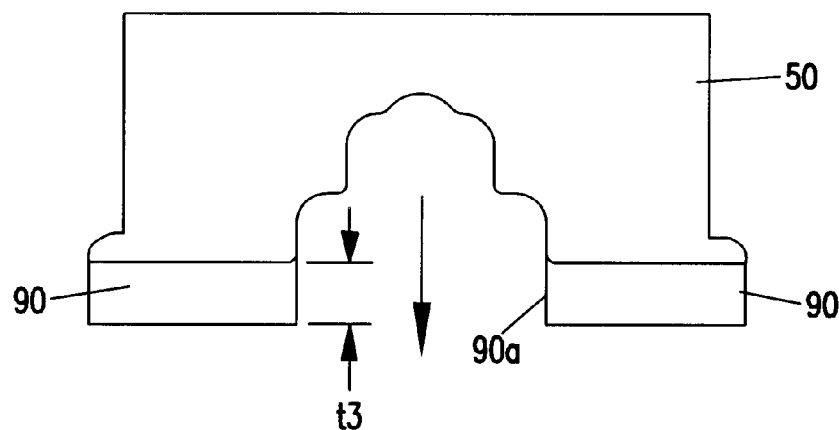
FIGS. 16A to 16C are diagrammatical views showing a modification of the shaping process shown in FIGS. 12A to 16C.
Figure 16B:
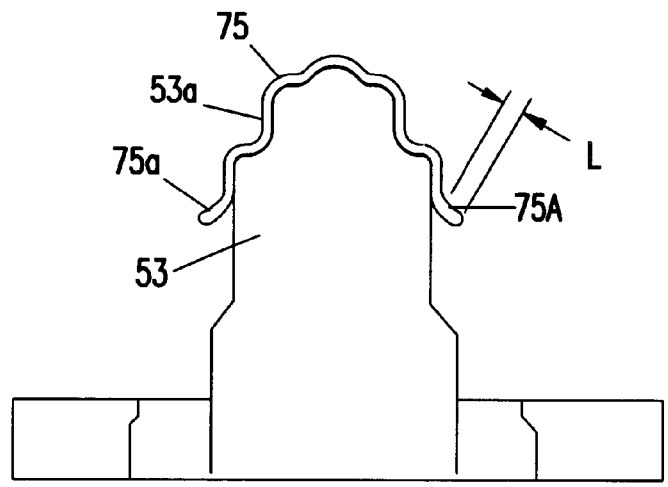
Figure 16C:
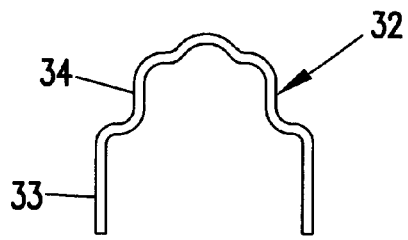

FIGS. 16A and 16B show an alternative of the process shown in FIG. 12C. According to the alternative process, a shaping plate 90 is attached to a lower surface of the master die 50. The shaping plate 90 has a shaping edge 90a formed as a downward extension of an open end edge of the recessed working surface of the master die 50. The thickness t3 of the shaping plate 90 is slightly greater than the length L of the radially outwardly projecting lower edge 75a of the punch panel 75. The shaping plate 90 is preferably formed from metal, such as steel or cast iron, or synthetic resin.

In operation, after the punch panel 75 is fitted over the working surface 53a of the master punch 53, the master die 50 is descended toward the master punch 53 so that the radially outwardly projecting lower edge 75a of the punch panel 75 is shaped into a rectilinear configuration by means of the shaping edge 90a of the shaping plate 90. The shaping plate 90 makes the manual hammering process shown in FIG. 12C unnecessary and increases the efficiency of the punch-forming process.

Although in the illustrated embodiment, the die panel 12 and the punch panel 32 are made of high-tensile steel or stainless steel, other materials can be used for the die and punch panels in view of the surface hardness of a blank sheet to be press-formed into a panel-like product. Likewise, materials for the back-up member 27, 42 are not limited to a high-strength cement or synthetic resin as described above with reference to the illustrated embodiment.

In the illustrated embodiment, the master punch 52 (53) is a fixed or stationary punch and the master die 50 (51) is a movable die. As an alternative, the master punch may be a movable punch and the master die is a stationary die.

Further, the spacer blocks 58 used to cut down the downward stroke of the master die 50 may be omitted when the press machine used for carrying out the inventive method is of the mechanical press in which a stroke adjuster is usually incorporated.

In the illustrated embodiment, the press-forming die assembly 10 is so designed as to manufacture a fuel tank of a motorcycle. The method of the present invention is not limited to the motorcycle fuel tank but can be also applied to the production of outer and inner panels of vehicle bodies, bonnets, alternator covers and so on of the motor vehicle.

Obviously, various minor changes and modifications of the present invention are possible in the light of the above teaching. It is therefore to be understood that within the scope of the appended claims, the present invention may be practiced otherwise than as specifically described.

What is claimed is:

1. A method of producing a press-forming die, comprising the steps of:

preparing a master die and a master punch relatively movable toward and away from each other so as to define therebetween a die cavity, the master die having a working surface partially defining to die cavity;

while a first blank sheet is disposed between the master die and the master punch, relatively reciprocating the master die and the master punch together, thereby press-forming the first blank sheet into a press-formed panel complementary in contour to the shape of the die cavity;

cutting down the working surface of the master die by a predetermined depth of cut;

fitting the press-formed panel over the master punch;

while a second blank sheet having a thickness equal to the predetermined depth of cut of the working surface is disposed between the master die and the press-formed panel fitted over the master punch, relatively reciprocating the master die and the master punch together, thereby press-forming the second blank sheet into a die panel complementary in contour to the shape of the press-formed panel; and applying a back-up material to the rear surface of the die panel to thereby produce a press-forming die.

2. The method according to claim 1, between the second-mentioned reciprocating step and the applying step, comprising the additional step of applying a backing material to the rear surface of the die panel.

3. The method according to claim 2, wherein the backing material comprises a water-soluble epoxy resin.

4. The method according to claim 2, wherein the backing material comprises a fibre-reinforced water-soluble epoxy resin.

5. The method according to claim 1, wherein the die panel is made of steel and has been subjected to a work-hardening process when the second blank sheet is press-formed into the die panel.

6. The method according to claim 1, wherein the back-up material comprises a high-strength cement.

7. The method according to claim 1, wherein the back-up material comprises a synthetic resin.

8. The method according to claim 1, wherein the applying step includes placing a slurry of high-strength cement on the rear surface of the die panel while removing bubbles from the slurry by the action of a vacuum.

9. The method according to claim 8, wherein the applying step further includes applying vibrations to the slurry to promote separation of the bubbles from the slurry.

10. A method of producing a press-forming punch, comprising the steps of:

preparing a master die and a master punch relatively movable toward and away from each other so as to define therebetween a die cavity, the master punch having a working surface partially defining the die cavity;

while a first blank sheet is disposed between the master die and the master punch, relatively reciprocating the master die and the master punch together, thereby press-forming the first blank sheet into a press-formed panel complementary in contour to the shape of the die cavity;

cutting down the working surface of the master punch by a predetermined depth of cut;

fitting the press-formed panel in the master die;

while a second blank sheet having a thickness equal to the predetermined depth of cut of the working surface is disposed between the master punch and the press-formed panel fitted in the master die, relatively reciprocating the master die and the master punch together, thereby press-forming the second blank sheet into a punch panel complementary in contour to the shape of the press-formed panel; and applying a back-up material to the rear surface of the punch panel to thereby produce a press-forming punch.

11. The method according to claim 10, between the second-mentioned reciprocating step and the applying step, comprising the additional step of applying a backing material to the rear surface of the punch panel.

12. The method according to claim 11, wherein the backing material comprises a water-soluble epoxy resin.

13. The method according to claim 11, wherein the backing material comprises a fibre-reinforced water-soluble epoxy resin.

14. The method according to claim 10, wherein the punch panel is made of steel and has been subjected to a work-hardening process when the second blank sheet is press-formed into the punch panel.

15. The method according to claim 10, wherein the back-up material comprises a high-strength cement.

16. The method according to claim 10, wherein the back-up material comprises a synthetic resin.

17. The method according to claim 10, wherein the applying step includes placing a slurry of high-strength cement on the rear surface of the punch panel while removing bubbles from the slurry by the action of a vacuum.

18. The method according to claim 17, wherein the applying step farther includes applying vibrations to the slurry to promote separation of the bubbles from the slurry.

19. A method of producing a press-forming punch and a press-forming die in succession, comprising the steps of:

preparing a master die and a master punch relatively movable toward and away from each other so as to define therebetween a die cavity, the master die and master punch having respective working surfaces jointly defining the die cavity;

while a first blank sheet is disposed between the master die and the master punch, relatively reciprocating the master die and the master punch together, thereby press-forming the first blank sheet into a press-formed panel complementary in contour to the shape of the die cavity;

cutting down the working surface of the master punch by at predetermined depth of cut;

fitting the press-formed panel in the master die;

while a second blank sheet having a thickness equal to the predetermined depth of cut of the working surface is disposed between the master punch and the press-formed panel fitted in the master die, relatively reciprocating the master die and the master punch together, thereby press-forming the second blank sheet into a first punch panel complementary in contour to the shape of the press-formed panel;

repeating the second-named reciprocating step to thereby produce a second punch panel;

applying a back-up material to the rear surface of the first punch panel to thereby produce a press-forming punch;

cutting down the working surface of the master die by a second predetermined depth of cut;

fitting the second punch panel over the master punch;

fitting the press-formed panel over the second punch panel;

while a third blank sheet having a thickness equal to the second predetermined depth of cut of the working surface of the master die is disposed between the master die and the second punch panel fitted over the master punch, relatively reciprocating the master die and the master punch together, thereby press-forming the third blank sheet into a die panel complementary in contour to the shape of the press-formed panel; and applying a back-up material to the rear surface of the die panel to thereby produce a press-forming die.

20. The method according to claim 19, comprising the additional steps of applying a backing material to the rear surface of the first punch panel, and applying a backing material to the rear surface of the die panel.

21. The method according to claim 20, wherein the backing materials comprise a water-soluble epoxy resin.

22. The method according to claim 20, wherein the backing materials comprise a fibre-reinforced water-soluble epoxy resin.

23. The method according to claim 19, wherein the die panel is made of steel and has been subjected to a work-hardening process when the third blank sheet is press-formed into the die panel, and the first punch panel is made of steel and has been subjected to a work-hardening process when the second blank sheet is press-formed into the first punch panel.

24. The method according to claim 19, wherein the back-up materials comprise a high-strength cement.

25. The method according to claim 19, wherein the back-up up materials comprise a synthetic resin.

26. The method according to claim 19, wherein the first mentioned applying step includes placing a slurry of high-strength cement on the rear surface of the first punch panel while removing bubbles from the slurry by the action of a vacuum, and the second-mentioned applying step includes placing a slurry of high-strength cement on the rear surface of the die panel while removing bubbles from the slurry by the action of a vacuum.

27. The method according to claim 26, wherein the first-mentioned applying step further includes applying vibrations to the slurry to promote separation of the bubbles from the slurry, and the second-mentioned applying step further includes applying vibrations to the slurry to promote separation of the bubbles from the slurry.

* * * * *